United States Patent
Saint-Jalmes et al.

(10) Patent No.: US 9,796,473 B2
(45) Date of Patent: Oct. 24, 2017

(54) MEDICAL BLOCK FOR THE CABIN OF AN AIRCRAFT, ASSOCIATED WITH A COUCHETTE

(75) Inventors: Bruno Saint-Jalmes, Toulouse (FR); Andre Rezag, Toulouse (FR); Jason Zaneboni, Blagnac (FR)

(73) Assignee: AIRBUS, Blagnac (FR)

( * ) Notice: Subject to any disclaimer, the term of this patent is extended or adjusted under 35 U.S.C. 154(b) by 1798 days.

(21) Appl. No.: 11/917,356

(22) PCT Filed: Jun. 9, 2006

(86) PCT No.: PCT/FR2006/001306
§ 371 (c)(1),
(2), (4) Date: Apr. 29, 2009

(87) PCT Pub. No.: WO2006/134252
PCT Pub. Date: Dec. 21, 2006

(65) Prior Publication Data
US 2009/0302156 A1    Dec. 10, 2009

(30) Foreign Application Priority Data
Jun. 16, 2005  (FR) ..................... 05 06132

(51) Int. Cl.
 *B64D 11/00* (2006.01)
 *A61G 3/00* (2006.01)
(52) U.S. Cl.
 CPC .............. *B64D 11/00* (2013.01); *A61G 3/001* (2013.01); *A61G 2220/10* (2013.01); *B64D 2011/0092* (2013.01)
(58) Field of Classification Search
 CPC ......... B64D 11/00; B64D 11/04; B64D 11/06; A61G 3/001

USPC ............................................ 244/118.5, 118.6
See application file for complete search history.

(56) References Cited

U.S. PATENT DOCUMENTS

| 2,654,895 A | * | 10/1953 | Stevens ............................... 5/9.1 |
| 4,115,884 A |   | 9/1978  | Keogh |
| 4,361,014 A | * | 11/1982 | Blain .............................. 62/237 |
| 4,458,864 A | * | 7/1984  | Colombo et al. ........... 244/118.5 |
| 4,570,733 A | * | 2/1986  | Star ........................ A61G 3/001 180/41 |

(Continued)

FOREIGN PATENT DOCUMENTS

| EP | 0 965 319 | 12/1999 |
| EP | 1 138 304 | 10/2001 |

(Continued)

OTHER PUBLICATIONS

Russian Decision to Grant dated Jun. 29, 2010 in corresponding Russian Application No. 2008101679 filed Jun. 9, 2006 (submitting English Translation only).

*Primary Examiner* — Christopher P Ellis
*Assistant Examiner* — Michael Wang
(74) *Attorney, Agent, or Firm* — Oblon, McClelland, Maier & Neustadt, L.L.P.

(57) ABSTRACT

A medical block associated with a couchette for a patient to lie on. The block includes: a water supply; a power supply; a stop region for at least one trolley; at least one trolley located in the stop region and including drawers containing medical equipment; and an access flap corresponding to each trolley, provided with a locking mechanism and enabling the drawers of the trolley to be accessed.

21 Claims, 5 Drawing Sheets

(56) References Cited

U.S. PATENT DOCUMENTS

| | | | | |
|---|---|---|---|---|
| 4,588,237 | A * | 5/1986 | Marder | 312/209 |
| RE32,176 | E * | 6/1986 | Vernon | 244/118.5 |
| 4,915,435 | A * | 4/1990 | Levine | A61G 3/001 29/428 |
| 5,083,727 | A | 1/1992 | Pompei et al. | |
| 5,236,390 | A * | 8/1993 | Young | A61G 3/001 296/19 |
| 5,259,575 | A | 11/1993 | Cabrera | |
| 5,474,260 | A * | 12/1995 | Schwertfeger | B64D 11/00 244/118.5 |
| 5,615,848 | A * | 4/1997 | Ceriani | B64D 9/00 244/118.5 |
| 5,964,065 | A * | 10/1999 | Migurski et al. | 52/64 |
| 6,273,366 | B1 * | 8/2001 | Sprenger | A61G 3/00 244/118.1 |
| 6,663,202 | B2 * | 12/2003 | Spann | 312/249.12 |
| 6,691,952 | B2 * | 2/2004 | Keogh | 244/118.5 |
| 6,761,332 | B1 * | 7/2004 | Bengtsson | 244/118.5 |
| 6,848,491 | B2 * | 2/2005 | Gambarelli | B65G 1/02 160/122 |
| 7,080,806 | B2 * | 7/2006 | Mills | 244/118.1 |
| 7,198,228 | B2 * | 4/2007 | Mills et al. | 244/118.5 |
| 7,275,796 | B2 * | 10/2007 | Bochner et al. | 312/209 |
| 8,069,993 | B2 * | 12/2011 | Yuyama et al. | 211/59.3 |
| 8,136,763 | B2 * | 3/2012 | Saint-Jalmes | B64C 1/1469 244/118.5 |
| 8,146,859 | B2 * | 4/2012 | Mariat | B64D 11/04 244/118.5 |
| 2002/0191744 | A1 * | 12/2002 | Mirabella | A61B 6/4405 378/102 |
| 2005/0001097 | A1 | 1/2005 | Saint-Jalmes | |
| 2005/0023413 | A1 * | 2/2005 | Saint-Jalmes | 244/118.6 |
| 2006/0060704 | A1 * | 3/2006 | Lavie | A61G 3/001 244/118.5 |
| 2008/0250559 | A1 * | 10/2008 | Janboecke | A61G 3/00 5/2.1 |

FOREIGN PATENT DOCUMENTS

| | | |
|---|---|---|
| FR | 2 426 608 | 12/1979 |
| RU | 954275 | 8/1982 |

* cited by examiner

MEDICAL BLOCK FOR THE CABIN OF AN AIRCRAFT, ASSOCIATED WITH A COUCHETTE

TECHNICAL FIELD

This invention relates to a medical unit intended to be laid out in an airplane or other aircraft cabin, and making it possible to provide high-quality medical care to a passenger during a flight.

BACKGROUND

Commercial flights are capable of transporting a greater and greater number of passengers over longer and longer periods of time. Elderly individuals also are more and more persuaded to take the plane. It therefore happens more and more frequently that a passenger is a victim of distress or an injury during a flight. When severe distress is involved, the faster first aid is given to him, the greater the passenger's chances of survival. It therefore is advisable to provide means making it possible to deliver first aid to the victim right on board the airplane.

From the U.S. Pat. No. 6,691,952 there is known an arrangement that can be set up during flight in order to provide first-aid care to a passenger. When not in use, the arrangement according to U.S. Pat. No. 6,691,952 consists of a cabinet installed in a partition positioned transversely in an airplane cabin, in front of a row of seats. This arrangement advantageously then occupies only a fairly small space in the cabin. The cabinet contains a foldaway berth, as well as compartments containing various requisites for diagnosis and medical care. In order to set up the berth, the cabinet is opened and it is spread out over two rows of seats the back of which has been turned down. The berth then rests on a support provided in the cabinet and on a base provided for this purpose, articulated on the berth and initially stored in the cabinet.

An arrangement according to U.S. Pat. No. 6,691,952 has several drawbacks. On the one hand, the layout is such that it allows only a very poor access to the victim and to at least a portion of the medical equipment housed in this arrangement. It thus is not possible, for example, to stand facing the patient at the side of the patient's head. On the other hand, the care that then can be given is very limited. In fact, it is difficult, or even impossible, to administer complex medical care to a victim occupying the berth described in this document.

SUMMARY

This invention has as its purpose to provide a medical unit that can be used for patients experiencing temporary distress and merely having to lie down in peaceful surroundings as well as for patients who are victims of severe attacks and whose life is in danger. Several levels of medical performance generally are distinguished for an aid station. According to a first level, "first-aid" type treatments are made possible. A second level provides for diagnoses and treatments within the province of general medicine. Finally, the third level relates to diagnoses and treatments applicable to emergency medicine. A medical unit according to the invention preferably can be adapted to each of these levels of medical performance.

The medical unit according to the invention is intended to be used in the case where a passenger falls ill during a flight, but preferably also should be able to be used to conduct a medical evacuation. This medical unit therefore advantageously provides a high degree of medical safety and preferably makes isolation of the patient possible.

Nonetheless, it is appropriate here to observe the commercial constraints of the airline companies. Thus, the space occupied by the medical unit, when the latter is not being used, should be as limited as possible. This medical unit preferably can be adapted to different areas of the aircraft in which it is installed.

A medical unit according to the invention preferably also should be progressive so as to be able to be adapted to new technologies.

This invention then proposes a medical unit for an aircraft cabin associated with a berth intended to accommodate a patient in lying-down position.

According to the invention, this medical unit comprises:
a supply of water,
a supply of electricity,
a parking area for at least one cart,
at least one cart positioned in the parking area and comprising drawers in which medical equipment is located, and
an access shutter corresponding to each cart, equipped with locking means, and allowing access to the drawers thereof.

Such a medical unit has the advantage of being able to be very compact. It can be barely wider than the cart (or carts) that it accommodates. When it is not being used, each shutter is closed and it is not possible for an unauthorized individual to access the medical equipment contained in the medical unit. The space around the unit then can be used in the normal manner to accommodate passengers. When a passenger has a health problem, an authorized individual can take a cart and go to the person's side. In the cart he has the equipment needed for first aid. If necessary, the passenger then is transported and laid on the berth associated with the medical unit. This berth then is positioned in the space provided to accommodate passengers in the normal manner. If passengers are occupying this space, they are moved to empty seats. Thus the space dedicated to the medical unit is very limited and, if need be, the room needed for giving care is gained in the space customarily accommodating passengers and is sufficient for providing the patient with the care that he requires. The fact of providing at least one cart also makes it possible to make a portion of the medical unit mobile.

In one embodiment of the invention, each access shutter allows access to the drawers of the corresponding cart from, for example, an area intended to accommodate passengers. Of course, it preferably involves the area intended to accommodate a patient on the berth associated with the medical unit. In this embodiment, in order to prevent the cart(s) from being able to roll toward the area intended to accommodate passengers, the medical unit according to the invention advantageously has restraining means preventing a cart from moving toward the adjacent area intended to accommodate passengers. These restraining means comprise, for example, a lower band and an upper band between which the corresponding access shutter is located.

According to a preferred variation of embodiment, according to which the space occupied by the medical unit according to the invention is optimized, the said medical unit preferably is delimited on the one hand by two walls extending transversely in the aircraft cabin, and on the other hand by a longitudinal wall and a cabin wall, and in that each shutter is implemented in a transverse wall.

In order to facilitate maneuvering of the carts, the medical unit advantageously also comprises an access door other than the access shutters, making it possible to move a cart back into and out of its parking area. This access door is implemented, for example, in a longitudinal wall of the medical unit.

In order to be able to be used under good hygienic conditions, the medical unit according to the invention advantageously comprises a water source such as a washbasin. It also can comprise a work surface making is possible to have medical equipment available away from the storage areas of the medical unit. This work surface advantageous is located above the parking area for the carts for an optimization of the space in the medical unit.

A medical unit according to the invention also preferably comprises a supply of oxygen. It may involve a supply from the systems of the aircraft or else from bottles of oxygen.

In order to fetch the patient in the aircraft, the medical unit advantageously additionally comprises a stretcher. The latter can be used afterwards as a berth to accommodate the patient, or else the patient can be transferred in known manner from the stretcher onto the berth.

When a stretcher is provided, at least two carts preferably also are provided, and the said carts and the stretcher advantageously are equipped with fastening means such that the two ends of the stretcher each can be fastened onto a cart.

In order to increase the capacity for storage of medical equipment, the medical unit advantageously comprises storage racks intended to accommodate medical apparatuses. It also may be equipped, for example, with at least one scialytic light, at least one retractable shelf and a telephone or similar apparatus making it possible to be in contact with a physician on the ground in order to make it possible to perform telemedicine.

This invention also relates to an aircraft cabin, characterized in that it comprises a medical unit such as described above.

In a preferred embodiment, such an aircraft cabin preferably also comprises an aircraft-cabin module of extended rectangular shape with:
  two large walls connected by two small walls,
  a door mounted in an opening made in a wall separating the module from an aisle,
  at least one seat having at least one configuration in which it is positioned longitudinally in relation to the direction of travel of the aircraft, and
  components that can form a bedding surface for at least one passenger.

The medical unit and the aircraft-cabin module then advantageously have a common wall, and the access shutters of the medical unit allow access to the drawers of the corresponding carts from the inside of the cabin module.

In such an aircraft cabin, the medical unit can comprise, for example, a washbasin and/or a work surface permanently accessible from the inside of the cabin module. Above the possible work surface, a window that can be obscured can be positioned. This window can be obscured throughout the duration of the flight and is transparent at the time of the takeoff and landing phases so that the flight personnel, in compliance with regulations, can see the passengers during these phases of the flight.

Finally, this invention relates to an aircraft, characterized in that it comprises a medical unit and/or an aircraft cabin such as described above.

BRIEF DESCRIPTION OF THE DRAWINGS

Details and advantages of this invention will emerge more clearly from the description that follows, presented with reference to the attached schematic drawings, on which.

DETAILED DESCRIPTION

All these Figures show some embodiments of a medical unit according to the invention. Different variations of embodiment may be contemplated in order to meet the needs of the airline companies. As indicated in the preamble above, three levels of intervention on a patient generally are distinguished. According to a first level, first-aid type care is given to the patient. Here the life of the patient is not in danger. He is, for example, stricken with temporary distress such as vagal distress. According to another level of intervention, the patient is more seriously ill and requires general medical care. Here it involves, for example, a patient suffering from renal colic. According to the last level, the life of the patient is in danger and a rather extensive intervention is to be contemplated rapidly. It involves, for example, a patient having a heart attack.

The airline companies, if they so desire, can choose to be able to intervene only on the first level, or on the second level as well, or else on the three levels.

Figure 1:
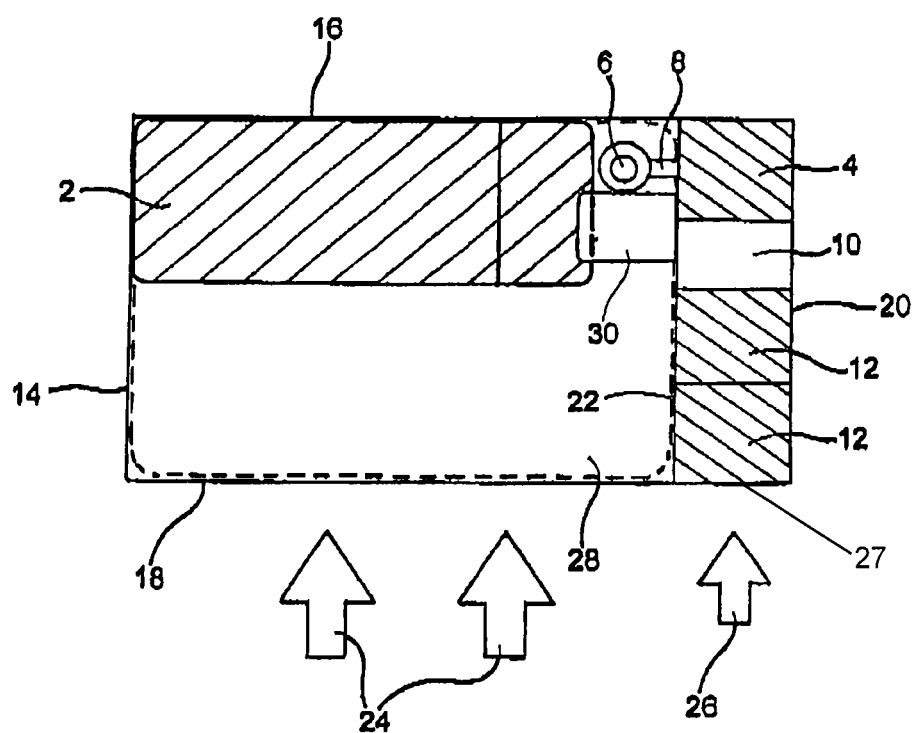
FIG. 1 is a plan view of a preferred embodiment of the invention.

FIG. 1 depicts in plan a medical unit that can be set up in an aircraft and intended to take care of a patient according to the aforementioned three levels of intervention. There is seen first of all on this plan a berth 2. On the side of the berth 2 intended to accommodate the head of a patient, storage is provided for various pieces of equipment. A first storage space 4 made up, for example, of fixed racks, accommodates, for example, mobile medical equipment such as, for example, devices for diagnosis (measurement of blood pressure, measurement of pulse, electrocardiogram, . . . ) and also devices for treatment (oxygen masks, electric syringes, . . . ). A supply of electricity in this first storage space 4 makes it possible to operate all these apparatuses. FIG. 1 also depicts a mobile device for direct lighting. It involves, for example, a scialytic light 6 mounted on an articulated arm 8. The arm 8 preferably can fold back and fit into a rack of the first storage space 4 with the scialytic light 6.

In order to be able to intervene on a patient under good hygienic conditions, it is advisable to provide a water source. On FIG. 1, therefore, beside the first storage space 4, a washbasin 10 has been depicted. Beside the latter are two storage spaces intended to accommodate single-use medical equipment in kits. Here it involves two carts 12 taking on the outer shape and the dimensions of the carts commonly used in aircraft, in particular for serving meals and beverages, and known under the name "trolley." These carts 12 are mobile and comprise drawers in which medical equipment is stored.

The medical module described above is, for example, of more or less rectangular shape, as depicted on FIG. 1. It is delimited, for example, on one side by the space in which the medical equipment is stored and where the washbasin 10 is located. On the side opposite this storage area is a transverse wall 14. In the example of FIG. 1, the berth 2 is positioned against the transverse wall 14 and against a longitudinal wall that can be formed by a cabin wall 16. On the side opposite the cabin wall 16 is a longitudinal wall 18 separating the medical module from an aisle.

The area for storage of medical equipment is delimited by two transverse faces. A first transverse face or outer transverse face 20 is a wall, for example more or less solid. It preferably involves a separating wall with a technical location, such as a lavatory, that is supplied with water and electricity. A supply of air, and preferably also of oxygen, likewise is provided. These various supplies run across the outer transverse face 20 in order to supply the medical module described above. The supply of oxygen can be implemented from a bottle positioned in the medical unit, between the two transverse faces 20 and 22.

The storage space also comprises an inner transverse face 22. The latter comprises numerous openings making it possible to access from the medical module various pieces of medical equipment and apparatuses stored in the storage space. All accesses to these pieces of equipment and apparatuses are gained through doors, shutters, or the like, that can be locked. On the other hand, concerning the washbasin 10, an opening can be provided in the inner transverse face 22 allowing continuous access to the washbasin 10.

Access to the berth 2 is gained, for example, from the aisle as symbolized by the access arrows 24. This access is gained, for example, through a door (not depicted) implemented in the longitudinal wall 18. Another door 27 allows access from the aisle to the carts 12. This access is symbolized by a third arrow 26.

The medical module of FIG. 1 thus makes it possible to intervene on a patient lying on the berth 2. The individual intervening on this patient has a movement area 28 around the berth 2 and access to all the equipment stored in the storage space. Various appurtenances not described above also can be provided. Thus, for example, as depicted on FIG. 1, a shelf 30 movable between an extended position and a retracted position inside the storage space can be provided.

Figure 2:
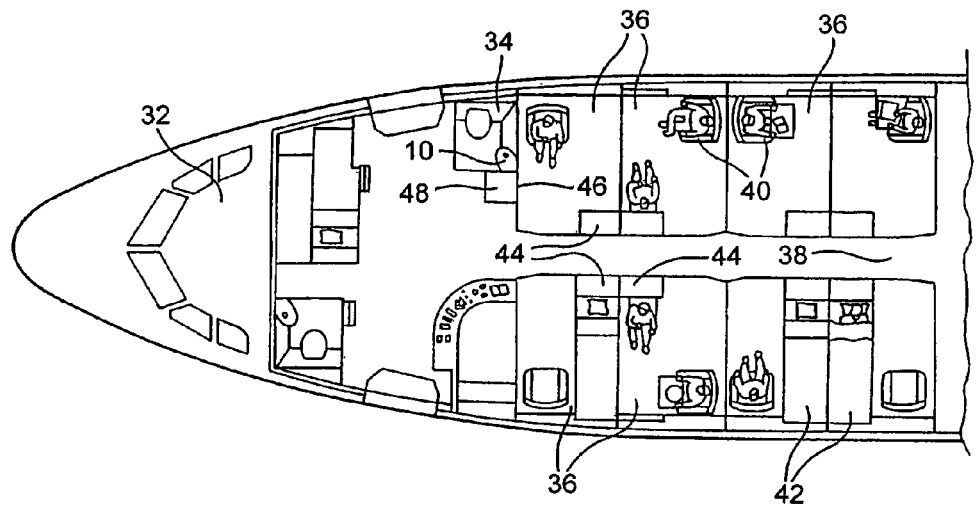
FIG. 2 is a plan view of the front of an aircraft cabin equipped with a medical unit according to the invention when it is not being used, FIG. 3 corresponds to the view of FIG. 2 when the medical unit is being used, FIGS. 4 and 5 correspond to FIGS. 2 and 3 respectively for a variation of embodiment of a medical unit according to the invention.
Figure 3:
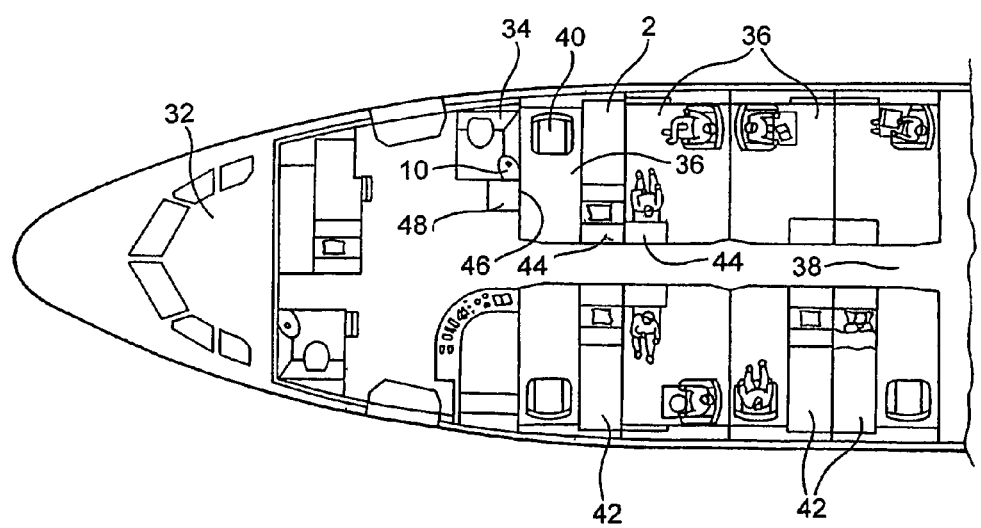

FIGS. 2 and 3 illustrate the installation of a first variation of embodiment of a medical unit according to the invention in an aircraft cabin. In this first embodiment, it involves a medical unit intended to provide only initial first-aid type care.

On these Figures there is seen a cockpit 32, with which there are associated a cabin and a lavatory for the crew as well as a portion of the aircraft cabin. In this cabin, on the side of the entrance is a lavatory 34, as well as modules 36 intended to accommodate passengers. The modules 36 are positioned on both sides of an aisle 38. Each module has an armchair 40 and a berth 42. The berth 42 can be folded back into a cabinet 44 arranged in each module 36 along one wall thereof.

A module 36 is positioned beside the lavatory 34. A separating wall 46 separates this module 36 from the lavatory 34. Against this separating wall 46, outside the module 36, is a compartment 48 extending, for example, over the entire height of the aircraft cabin. In its lower portion, on the side of the cabin floor, this compartment 48 is adapted for accommodating a cart such as the carts 12 of FIG. 1. Here it involves a cart taking on the dimensions of a cart used for the aircraft on-board service. Because of its dimensions, it involves a cart referred to as "demi-trolley." This cart can be set up in the compartment 48 from the aisle 38. The cart positioned inside the compartment 48 contains medical equipment stored in drawers. A shutter that can be locked (not depicted on FIGS. 2 and 3) is implemented in the separating wall 46 so as to be able to access the drawers of the cart placed in the compartment 48. This cart, of course, is positioned appropriately in the compartment 48.

The cart does not occupy the entire space of the compartment 48, but only the lower portion thereof. In the upper portion thereof, racks are laid out for accommodating medical equipment. These racks are accessed from the inside of the module 36 by means of a shutter, itself also able to be locked.

The separating wall 46 also comprises an opening allowing access to the washbasin 10 of the lavatory 34.

In order to avoid having to open separately the access to the cart positioned in the compartment 48, then the access to the racks of this same compartment, then to the washbasin 10, a door can be provided sliding along the separating wall 46 between a position where accesses to the medical equipment and to the washbasin are open and a position in which the sliding door can be locked and in which all accesses to the pieces of medical equipment are closed.

It further is provided to supply the compartment 48 with electricity from the lavatory 34.

FIG. 2 depicts the aircraft cabin under normal conditions of use. A passenger has taken a seat in the armchair 40 of module 36 positioned beside the lavatory 34. On FIG. 3, the module 36 located beside the lavatory 34 is converted into a medical module ready to accommodate a patient. It then is seen, in comparison with FIG. 2, that the bed of the module 36 has been spread out to form a berth 2. Accesses to the compartment 48 from the inside of the module 36 are open. The berth 2 is ready to accommodate a patient who will be able to be taken care of within the module 36. The patient then has peace and calm, separated from the other passengers, and first aid can be given to him under good conditions.

It is seen in this variation of FIGS. 2 and 3 that the volume of the compartment 48 is restricted. For this reason, the medical equipment carried is limited and the medical module implemented is intended most especially to accommodate patients requiring first-aid type care.

It is also possible, however, to add to the outfitting of the module 36. Then housing of the medical equipment can be provided in the cabinet 44 accommodating the berth when the latter is being stored. Depending on the equipment housed in the cabinet 44, the medical module implemented then also can be adapted for providing therein care within the province of general and/or emergency medicine (levels 2 and/or 3).

Figure 4:
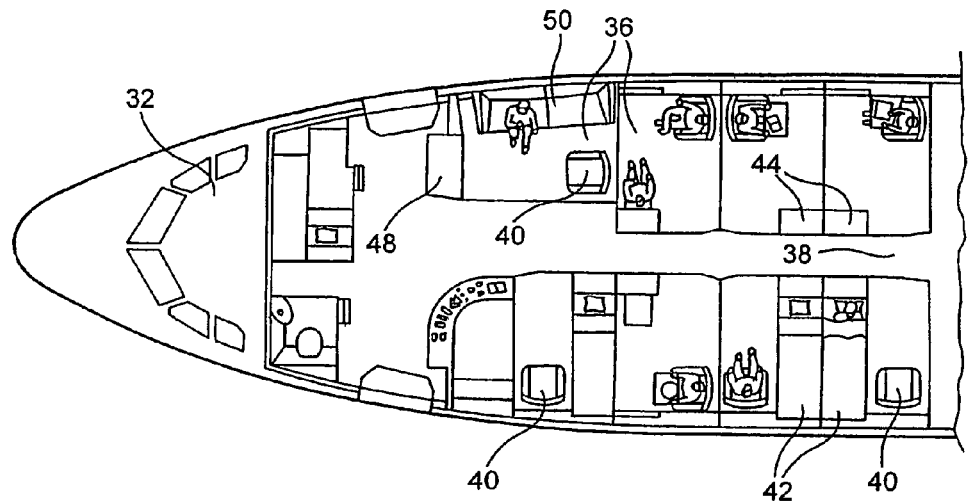
Figure 5:
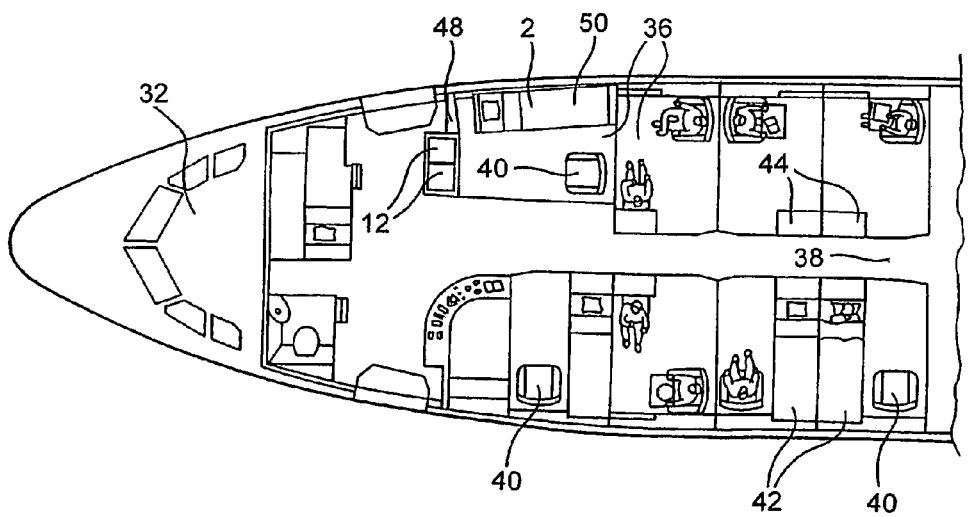

FIGS. 4 and 5 show a second embodiment of a medical unit according to the invention. For similar components, there are used on these Figures the same references as those used previously with regard to FIGS. 1 to 3.

Figure 6:
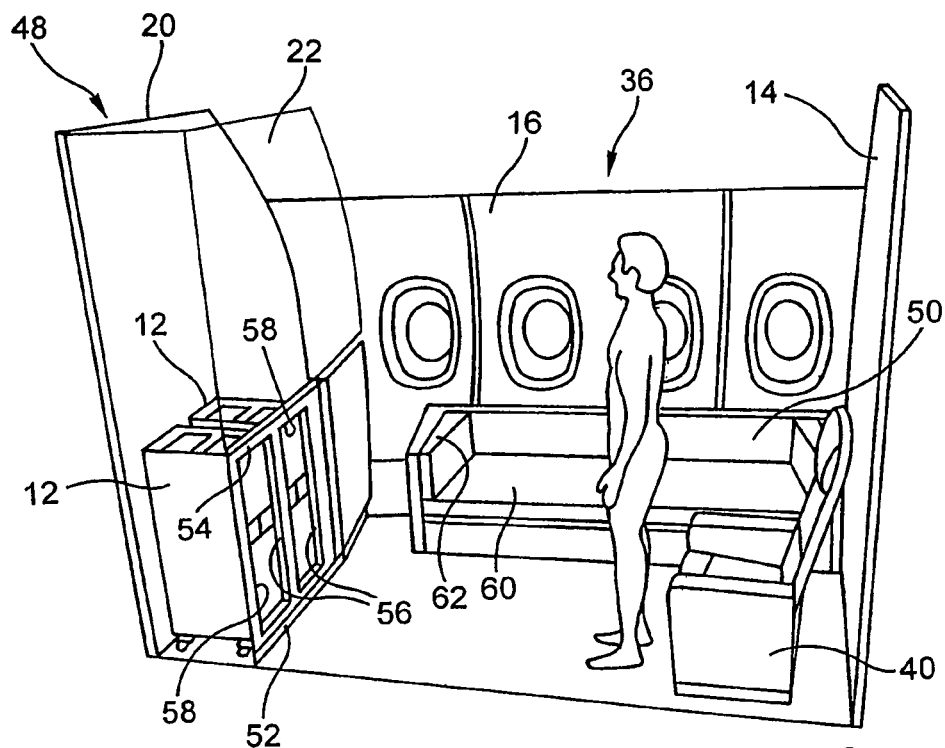
FIGS. 6 and 7 show a cabin module according to the invention in perspective.
Figure 7:
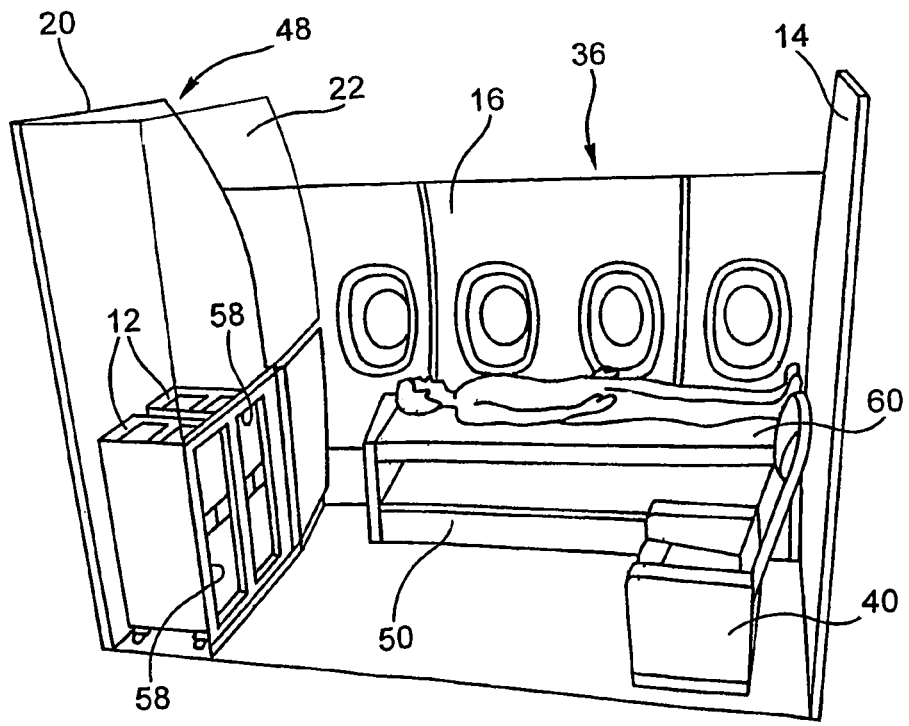

On these Figures there are seen the cockpit 32 of an aircraft as well as modules 36 served by an aisle 38. There is noted a module with a somewhat distinctive layout, since it has a bench 50 (FIG. 4). Here this module is intended to be used, if need be, as a medical module. This module can be used as a first-class cabin for transport of passengers. Inside this cabin, the passenger has an armchair 40 and the bench 50 that can be converted into a bed. This cabin is positioned toward the front of the airplane and is placed side by side with a compartment 48. Here this compartment is proportioned to accommodate two demi-trolleys in which medical equipment as well as medical apparatuses and a washbasin are stored. The compartment 48 is supplied with water, electricity and oxygen. FIGS. 6 and 7 show this compartment 48 and the corresponding module 36 in perspective. FIG. 6 corresponds to the layout of FIG. 4 and FIG. 7 to that of FIG. 5.

It is clearly noted on FIGS. 6 and 7 that the carts 12 stored in the compartment 48 face the inside of the cabin 36 with which they are associated. It is well to hold the carts in the compartment 48 even in the event of violent impact. In order to hold these carts 12, a lower band 52 and an upper band 54 are provided on the side of the cabin 36. These bands are reinforced in order to keep the carts 12 inside the compartment 48 even in the event of violent impact. Between these bands 52 and 54 are two shutters 56 making it possible to close off access to the cart 12 from the inside of the corresponding module 36. On FIGS. 6 and 7, the shutters are depicted in open position. They thus free up an opening 58 allowing access to the drawer of the carts 12. In order to go from their closed position to their open position, the shutters 56 pivot 90° around a vertical axis and then are slid to become positioned beside the corresponding cart 12 in the compartment 48.

On FIGS. 6 and 7, it is noted that the bench 50 comprises a structure on which there are positioned, on the one hand, a seat 60, and on the other hand, cushions 62 forming the armrests and the back of this bench 50. The seat 60 of the bench 50 can be used as a stretcher. Advantageously, for fetching a passenger in the aircraft, the seat 60 is removed from the bench 50 and is positioned on the two carts 12 stored in the compartment 48. There is then a cart at the head of the stretcher formed by the seat 60 and another cart 12 beneath the other end of this stretcher. Fastening means (not depicted) make it possible to hold the stretcher on the carts 12. Thus the patient can be transported in complete safety. In addition, there is medical equipment (that located in the carts 12) right at the scene and it can be used for first aid, even prior to transport of the afflicted passenger.

Depending on the height of the carts 12 and that of the seats, and other obstacles in the cabin of the aircraft, an intermediate component can be provided between each cart 12 and the stretcher in order to raise the latter. In this way movement with the stretcher in the aircraft is facilitated.

Figure 8:
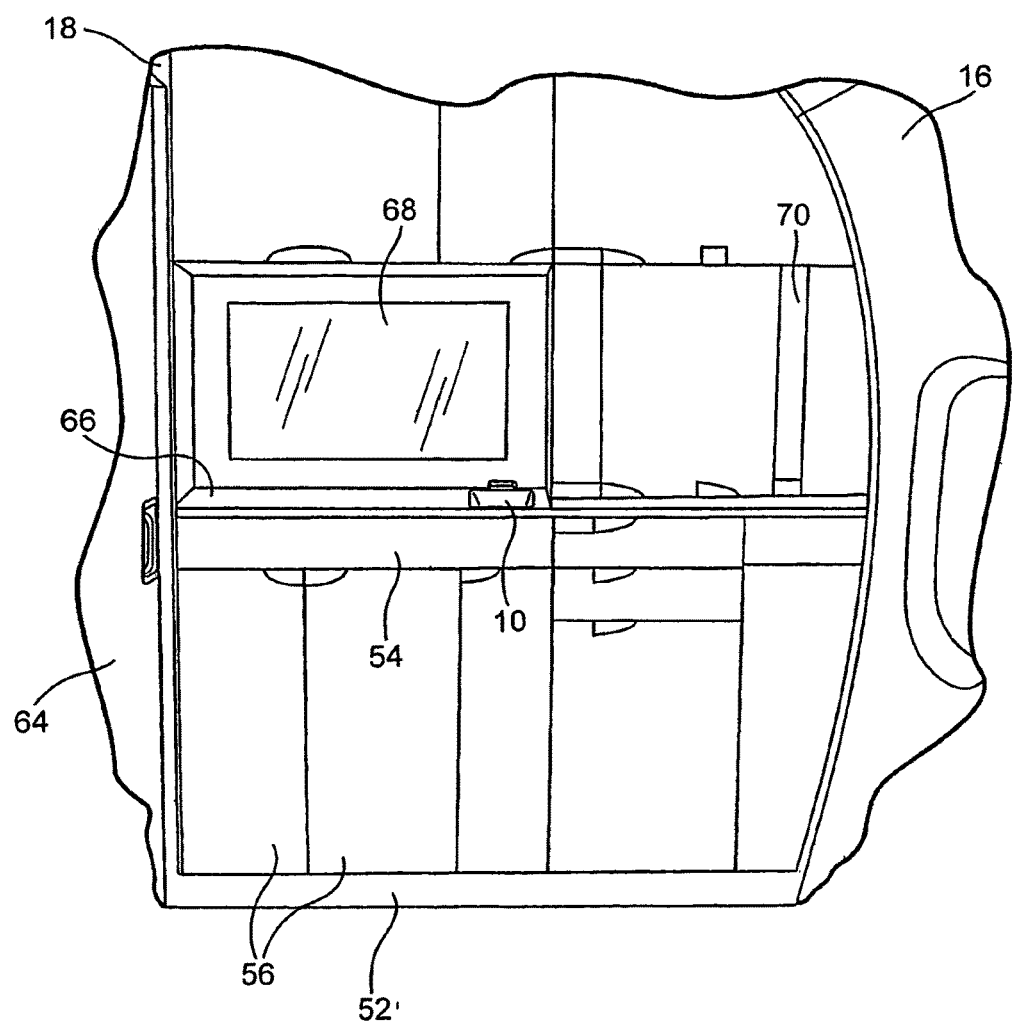
FIG. 8 is a front view of a preferred embodiment of a medical unit according to the invention.

FIG. 8 shows in front view a medical unit seen from a cabin 36 such as the cabin of FIGS. 4 to 7. Here there are seen the shutters 56 making it possible to access the carts 12 (concealed on FIG. 8), the lower band 52 and the upper band 54 preventing the carts from coming out of their compartment, as well as various other fittings such as the washbasin 10. On the right of FIG. 8 there is seen the cabin wall 16, and to the left a door 64 making it possible to have access from an aisle in the module.

Beside the washbasin 10 is a work surface 66. The latter thus is positioned above the carts located in the compartment 48. A trash can is provided underneath the washbasin 10. A window 68 that can be obscured is provided behind the work surface. Thus, during the phases of landing and takeoff, the flight personnel can see what is happening inside the module. In fact, the rules provide that the flight personnel must see at least 50% of the passengers during these phases of landing and takeoff. In particular it is necessary to ensure that the passengers, for their safety, are not standing up during these phases.

It is seen that all available spaces are provided for implementing housings each accessible by a door, a shutter or the like. A narrow space closed by a narrow door 70, for example, is provided to house a screen (not depicted). All the electrical apparatuses stored in the compartment 48 are, of course, supplied with electricity and ready to function. To the extent possible, wire connections are eliminated. The various pieces of equipment, such as screens, for example, preferably are connected to the corresponding apparatus by the technology known under the name of Bluetooth.

The medical unit also is equipped with a telephone apparatus allowing a connection with the ground, more precisely with a medical center specializing in telemedicine.

The compartment 48 can contain all kinds of medical apparatuses. It is pointless to make an exhaustive list of them here. All types of apparatuses for diagnosis and treatment can be found here. It involves apparatuses that are found, in particular, in emergency-aid vehicles (ambulances, helicopters, . . . ) or else even in treatment rooms.

The preceding description shows preferred embodiments of the invention in which the medical unit according to the invention is used in combination with a module intended to accommodate a passenger. Such a module generally is used in first class. The invention, however, also may be implemented in a portion of the cabin intended to accommodate passengers traveling in business class or economy class. A compartment 48 accommodating one or two (or more) carts 12 as well as storage for accommodating medical apparatuses and equipment then can be provided. This compartment is supplied at least with water and electricity, preferably also with oxygen and/or air. When a patient must be given care, he is laid on a berth close to the medical unit according to the invention. In business class, the seats sometimes are convertible into beds. A seat then may be used to accommodate a patient. In economy class, it is already known to adapt a stretcher, or berth, on a row of seats. Prior-art arrangements of this type can be used here. By way of non-limitative example, there may be cited here a berth for a patient such as described in the document EP-0 965 319. Then in order to allow isolation of the patient, there can be provided, in combination with the medical unit according to the invention, a curtain and a rail mounted on the ceiling of the cabin in order to make it possible to surround the area intended to accommodate the patient.

A medical unit such as described above takes up very little space in an aircraft. The space occupied by such a unit corresponds to a volume ranging from one-fourth of the volume of a lavatory to one-half the volume of a lavatory. This medical unit therefore looks like a transverse wall of substantial thickness. This thickness can be less than 50 cm. It therefore is possible to house such a medical unit in most aircraft without having to plan on removing seats.

It is possible, of course, to provide several medical units in an aircraft. Such a medical unit preferably is installed at a place in the aircraft supplied with both water and electricity. Such a medical unit, therefore, preferably is next to a lavatory or a galley.

The space occupied can be minimal, by virtue of the novel idea of providing a dedicated area in the aircraft for accommodating medical equipment and using the space intended to accommodate a patient for accommodating a passenger. The latter, if no one in the aircraft requires medical care, is not aware that he is traveling in the "infirmary."

If an individual falls ill during a flight, the passenger(s) displaced in order to allow the patient to lie down will take the patient's seat and/or other seats that may be empty.

In the embodiments depicted on the drawings, the medical module also can be used to carry out a medical repatriation. It then is possible, when the module comprises the appropriate equipment, to conduct a medical repatriation by using an airliner rather than chartering an air ambulance. That makes it possible to cut down on costs for the insurance company having to carry out the medical repatriation and at the same time makes it possible for an airline company to make a facility on board one of its aircraft cost-effective.

When the medical unit according to the invention is not being used, it is important that unauthorized individuals are not able to access this medical unit. In fact, the latter contains medications and drugs that absolutely must be kept under lock and key. Furthermore, no one should be able to damage the medical equipment, which might then be unusable. As emerges from the preceding description, however, a washbasin of the medical unit, a work surface, or other appurtenances, can be permanently accessible. This makes it possible to enhance the comfort of the passenger(s) traveling in the vicinity of the medical unit.

In a medical unit according to the invention, it is easy to replace a broken or obsolete apparatus without incurring unnecessary costs. Thus a medical unit according to the invention always can contain effective equipment. It thus makes it possible to provide a high-quality medical service in an aircraft. An intervention performed on board this aircraft can be carried out under supervision by an expert medical center on the ground by virtue of telemedicine capabilities.

Depending on the wishes of the airline company, the equipment of the medical unit can be more or less complete and more or less sophisticated. Irrespective of the option chosen, the proposed medical unit can be adapted to the aircraft without changing the initial structure thereof.

This invention is not limited to the embodiments described above by way of non-limitative examples. It relates to all the variations of embodiment referred to, as well as all the other variations of embodiment within the capacity of the individual skilled in the art, in the context of the claims below.

The invention claimed is:

1. A medical unit for an aircraft cabin associated with a berth configured to accommodate a patient in lying-down position, comprising:
   a supply of water;
   a supply of electricity;
   a first transverse wall and a second transverse wall, the first and second transverse walls extending across the aircraft cabin transverse to a longitudinal direction of the aircraft cabin;
   at least one cart;
   a parking area for the at least one cart, the parking area positioned between the first and second transverse walls, the at least one cart being positioned in the parking area, the at least one cart including drawers in which medical equipment is located;
   a movement area within the medical unit, the second transverse wall positioned between the first transverse wall and the movement area, and the second transverse wall positioned adjacent the movement area;
   an access shutter corresponding to the at least one cart, the access shutter including a locking means, and the access shutter configured to be moved between an open position to allow access to the at least one cart from the movement area, and a closed position to prohibit access to the at least one cart from the movement area, the access shutter being provided in the second transverse wall between the parking area and the movement area;
   at least one band disposed along a first side surface of the at least one cart so as to prevent the at least one cart from moving into the movement area within the medical unit; and
   an access door through which the at least one cart moves into and out of the parking area from an isle of the aircraft cabin, the access door provided separately from and spaced apart from the access shutter, the access door being positioned in a longitudinal wall that extends in the longitudinal direction of the aircraft cabin, the longitudinal wall being oriented substantially perpendicular to the first and second transverse walls, and the access door is oriented substantially perpendicular to the access shutter,
   wherein when the at least one cart is positioned in the parking area, the first side surface of the at least one cart faces the access shutter and the movement area, and a second side surface of the at least one cart faces the longitudinal wall and the access door,
   wherein, when the access shutter is in the open position, the access shutter is disposed along the first side surface of the at least one cart allowing access to the drawers of the at least one cart,
   and wherein, when the access shutter is in the closed position, the access shutter is positioned between the movement area within the medical unit that accommodates passengers and the drawers of the at least one cart.

2. The medical unit according to claim 1, wherein the at least one band includes a lower band and an upper band between which the access shutter is located.

3. The medical unit according to claim 1, wherein the medical unit is delimited by the first transverse wall, the second transverse wall, the longitudinal wall, and a cabin wall.

4. The medical unit according to claim 1, wherein the supply of a water is a washbasin.

5. The medical unit according to claim 1, further comprising a work surface.

6. The medical unit according to claim 5, wherein the work surface is above the parking area for the at least one cart.

7. The medical unit according to claim 1, further comprising a supply of oxygen.

8. The medical unit according to claim 1, further comprising a stretcher.

9. The medical unit according to claim 8, comprising at least two carts, and the at least two carts and the stretcher include fastening means such that ends of the stretcher each can be fastened onto a cart.

10. The medical unit according to claim 1, further comprising storage racks configured to accommodate medical apparatuses.

11. The medical unit according to claim 1, further comprising at least one scialytic light.

12. The medical unit according to claim 1, further comprising at least one retractable shelf.

13. The medical unit according to claim 1, further comprising an apparatus to contact a physician who is not located in the aircraft cabin so as to enable telemedicine.

14. An aircraft cabin, comprising a medical unit according to claim 1.

15. The aircraft cabin according to claim 14, further comprising an aircraft cabin module of extended rectangular shape including
   two primary walls connected by two secondary walls, which are smaller than the primary walls;
   a door mounted in an opening made in one of the primary or secondary walls, which separates the aircraft cabin module from an aisle;
   at least one seat having at least one configuration in which the seat is positioned longitudinally in relation to a direction of travel of the aircraft cabin; and
   components configured to form a bedding surface for at least one passenger,
   wherein the medical unit and the aircraft cabin module have a common wall, and wherein the access shutter of the medical unit allows access to the drawers of the at least one cart from inside of the aircraft cabin module.

16. The aircraft cabin according to claim 15, wherein the medical unit further comprises a washbasin, and the washbasin is only accessible from inside of the aircraft cabin module.

17. The aircraft cabin according to claim 15, wherein the medical unit further comprises a work surface, and the work surface is only accessible from inside of the cabin module.

18. The aircraft cabin according to claim 17, wherein the medical unit further comprises a window that can be obscured and is positioned above the work surface.

19. An aircraft, comprising a medical unit according to claim 1.

20. The medical unit according to claim 1, further comprising a bed, which, in a first position, is disposed extending horizontally with respect to a plane of the movement area within the medical unit so as to accommodate the patient in the lying-down position, and which, in a second position, is stored in a cabinet extending vertically with respect to the plane of the movement area within the medical unit.

21. The medical unit according to claim 1, further comprising a lower band and an upper band disposed along the first side surface of the at least one cart,
wherein the access shutter is supported on the upper and lower bands such that, in a closed position, the access shutter is disposed against the upper and lower bands to prevent access to the drawers of the at least one cart, and in an open position, the access shutter pivots and slides beside the at least one cart within the parking space.

* * * * *